(12) United States Patent
Martinez-Martin et al.

(10) Patent No.: US 10,830,734 B2
(45) Date of Patent: Nov. 10, 2020

(54) MICROCANTILEVER

(71) Applicant: Nanosurf AG, Liestal (CH)

(72) Inventors: David Martinez-Martin, Basel (CH); Daniel Müller, Basel (CH); Gotthold Fläschner, Freiburg (DE)

(73) Assignee: Nanosurf AG, Liestal (CH)

( * ) Notice: Subject to any disclaimer, the term of this patent is extended or adjusted under 35 U.S.C. 154(b) by 210 days.

(21) Appl. No.: 16/038,250

(22) Filed: Jul. 18, 2018

(65) Prior Publication Data

US 2019/0025257 A1   Jan. 24, 2019

(30) Foreign Application Priority Data

Jul. 18, 2017  (EP) ..................................... 17001238
Mar. 29, 2018  (EP) ..................................... 18000307

(51) Int. Cl.
*G01N 29/02* (2006.01)
*G01N 29/036* (2006.01)

(52) U.S. Cl.
CPC .......... *G01N 29/022* (2013.01); *G01N 29/036* (2013.01); *G01N 2291/014* (2013.01); *G01N 2291/0255* (2013.01); *G01N 2291/0256* (2013.01); *G01N 2291/0257* (2013.01); *G01N 2291/0427* (2013.01)

(58) Field of Classification Search
CPC ..... G01N 2291/014; G01N 2291/0255; G01N 2291/0256; G01N 2291/0257; G01N 2291/0427; G01N 29/022; G01N 29/036
See application file for complete search history.

(56) References Cited

U.S. PATENT DOCUMENTS

| 5,475,318 | A | * | 12/1995 | Marcus | ............. | G01R 1/07342 324/755.07 |
| 5,992,226 | A | | 11/1999 | Green et al. | | |
| 6,016,686 | A | | 1/2000 | Thundat | | |
| 7,521,257 | B2 | * | 4/2009 | Adams | .................. | G01Q 60/34 250/234 |
| 8,252,598 | B2 | * | 8/2012 | Koley | ................. | G01N 29/022 436/149 |
| 8,869,311 | B2 | * | 10/2014 | Hirose | .................. | G01Q 60/30 850/1 |
| 9,772,305 | B2 | * | 9/2017 | Tao | ........................ | G01N 27/60 |
| 10,191,004 | B2 | * | 1/2019 | Koley | .................. | G01N 27/128 |
| 2004/0115711 | A1 | * | 6/2004 | Su | ........................ | C12Q 1/6825 435/6.19 |
| 2004/0194534 | A1 | * | 10/2004 | Porter | ............. | G01N 33/54386 73/24.01 |

(Continued)

FOREIGN PATENT DOCUMENTS

EP   2908123 A1   8/2015
WO   2004012201 A2   2/2004

OTHER PUBLICATIONS

Yi-Kuang Yen et al. "A Novel, Electrically Protein-manipulated Microcantilever Biosensor for Enhancement of Capture Antibody Immobilization", Sensors and Actuators B 141 (2009) p. 498-505, published by Elsevier.

(Continued)

*Primary Examiner* — Francis C Gray
(74) *Attorney, Agent, or Firm* — Michael J. Brown

(57) ABSTRACT

The invention relates to a microcantilever, a measuring device and a method for determining mass and/or mechanical properties of a biological system.

18 Claims, 5 Drawing Sheets

(56) References Cited

U.S. PATENT DOCUMENTS

| | | | |
|---|---|---|---|
| 2006/0219010 A1 | 10/2006 | Ilic et al. | |
| 2007/0145966 A1* | 6/2007 | Shekhawat | G01N 29/036 324/71.1 |
| 2007/0169553 A1* | 7/2007 | Mutharasan | G01H 11/08 73/579 |
| 2010/0024572 A1* | 2/2010 | Roukes | G01L 1/044 73/862.625 |
| 2010/0028902 A1* | 2/2010 | Brown | G01N 33/54373 435/7.1 |
| 2011/0067150 A1 | 3/2011 | Holscher et al. | |
| 2011/0265227 A1* | 10/2011 | Shih | B82Y 35/00 850/33 |

OTHER PUBLICATIONS

European Patent Office, European Search Report, dated Jun. 22, 2018.

* cited by examiner

# US 10,830,734 B2

MICROCANTILEVER

PRIORITY

The present application claims priority from European Patent Application No. 17001238.9, filed Jul. 18, 2017 and from European Patent Application No. 18000307.1, filed Mar. 29, 2018.

FIELD OF INVENTION

The invention relates to a microcantilever, a measuring device and a method for determining mass and/or mechanical properties of a biological system.

BACKGROUND OF THE INVENTION

Cantilevers and measuring devices as well as methods for determining mass and/or mechanical properties of biological systems are known from the state of the art.

Micro cantilevers, which are microresonators with both at least a fixed and a free end (for instance triangular cantilevers have two fixed ends) can be used to determine the mass of objects attached to them, since their natural resonance frequency is a function of the mass. In particular, cantilevers immersed in liquids can be used to track over time the total mass of cells in culture conditions. However, the mass sensitivity of a cantilever depends on the position in which the mass is located. Micro cantilevers known from the state of the art consist of one straight beam. In the case of living cells, the position of the cell on the cantilever can change over time since some cells are able to migrate. Consequently, the cell position must be tracked in order to accurately determine its mass. In particular the cantilever mass sensitivity at a certain position of the cantilever is proportional to the square of the oscillation amplitude at that position. Therefore, in particular the mass sensitivity of rectangular cantilevers vibrating at the fundamental mode, which is defined by the lowest natural resonance frequency, is maximum at the free and zero at the fixed end. This can lead to a massive inaccuracy depending on cell position.

SUMMARY OF THE INVENTION

It is an object of the invention to improve these known devices.

The object of the present invention is solved by the subject-matter of the independent claims; further embodiments are incorporated in the dependent claims.

According to a first aspect of the invention a solution to this technical problem is achieved by providing a microcantilever in particular for a measuring device for determining mass and/or mechanical properties of a biological system wherein the cantilever has a barrier preventing migration of the biological system.

The barrier of the microcantilever provides a cantilever section to host a biological sample, a living cell, for example, so that its mass is determined accurately, with or without tracking its position over time. In other words, the need of position tracking of the biological system for accurate determination of its mass is avoided or at least minimized.

The barrier can be a physical, geometrical restriction on the cantilever, like specific geometries that use narrow necks over which a biological system like a cell does not like to migrate. The geometrical restriction can be provided as a gap or a hole in the cantilever beam. The gap divides the cantilever in two sections or pieces: one section where the biological system is provided, e.g. cells, and another section free of the biological system. Therefore, the mass of the biological systems can be determined effectively. Furthermore, the size of the section providing the biological system can be minimized according to size of the biological system, if required. In some examples, where the section is provided such that position correction is no longer needed, this section might be enlarged.

The geometrical restriction on the cantilever can be provided by a connector connecting the two sections or pieces of the cantilever beam. Also, a cantilever beam having a triangular shape, where the section free of the biological system is an empty space within the triangular shape and/or the beams holding the section to host the biological system, provides effective boundaries to restrict the possible locations of the biological system and accurately determine its mass. For example, the beams can be chosen for instance very narrow or with special physical or chemical properties so that migration of the biological system through them is avoided.

A barrier can also be achieved by a functional barrier. In this case a part of the cantilever is functionalized to adhere and/or repel to a biological system. Functionalization of the cantilever can mean that it is physically or chemically modified in order to exhibit different physical, chemical or biological properties. The functionalization can have different applications, for instance to attach the biological sample to the cantilever or to induce a special behavior of the sample. As an alternative to chemical functionalization of the cantilever, also other methods to adhere the biological system to the cantilever are possible. In particular: a micro-channeled cantilever can be used that adheres the biological system to the cantilever by means of a suction mechanism. The attachment between the sample and the cantilever can also be achieved by using magnetic or electric interactions mediated by magnetic coatings, electrical fields or for instance creating a Lorentz force by driving current through the cantilever while being subjected to magnetic fields. Occasionally, specific functionalization will not be necessary, if the sample attaches to the cantilever without specific binding means because of already existing physical or chemical interactions between the sample and the cantilever. These alternatives will be considered equivalent to the chemical functionalization by a person skilled in the art.

A barrier can also be achieved by a platform linked to the cantilever. The one or more edges of the platform build a respective barrier. By providing this platform, the whole platform can be oscillated with a certain amplitude. Thus, samples attaching to the platform can freely move on the platform with a constant cantilever mass sensitivity. Living cells or any other sample can be attached on the platform.

The platform can preferably, but not limited to, be linked to the free end of the cantilever or nearby, however other locations are possible as well. A platform linked to or near the free end of the cantilever beam can be favorable, in particular for rectangular cantilevers, vibrating at the fundamental mode, which is defined by the lowest natural resonance frequency, since it provides maximum mass sensitivity.

The platform can be preferably perpendicular or parallel to the cantilever beam. The platform is preferably linked to a small portion of the cantilever (cf. FIG. 2). This has the advantage that by construction the whole platform is moving essentially with the same oscillation amplitude. Therefore, the mass of any sample attached on the platform can be accurately determined without the need of tracking and accounting for possible sample displacements within the platform. Furthermore, by use of physical or chemical modifications, like edges of the platform or coatings, samples are confined to stay within the platform, being very unlikely that migrating samples such as some mammalian cells, move out from the platform. The platform can define a T or L shaped cantilever. This means that the perpendicular platform can be attached at one side or at the middle to the cantilever beam. Also, other geometries can be used (cf. FIG. 2).

The platform can be preferably linked near an antinode of the cantilever or preferably linked to an antinode of the cantilever beam. The antinodes of the cantilever are points with the highest oscillation amplitude for a certain eigenmode and therefore provide the highest mass sensitivity. The number and location of antinodes depends on the vibration eigenmode of the cantilever and the cantilever geometry. The cantilever can be oscillated with several eigenmodes simultaneously. Having the platform linked near or to an antinode, the whole platform moves with the amplitude of the antinode.

The cantilever beam can be provided with more than one platform. Each platform can be preferably linked to or near an antinode. Therefore, as example, it could be possible to have a cantilever that has a platform located at the antinode of the fundamental eigenmode and a second platform located at one antinode of the fourth eigenmode of the cantilever beam. The platforms may have any orientation relative to the cantilever beam.

The microcantilever is compatible with state of the art optical microscopies.

A second aspect of the invention relates to a measuring device in particular for determining mass and/or mechanical properties of a biological system with a microcantilever according to the invention wherein the measuring device is a scanning probe microscope, atomic force microscope (AFM), cytomass device (cf. FIG. 4), microfluidic system or a micro chamber.

The measuring device can be combined with state of the art optical microscopes such as fluorescence microscopy, confocal microscopy, differential interference contrast, phase contrast, etc. Preferably the cantilever and/or platform or at least part of it is partially transparent for at least a wavelength within the visual spectrum. This has the advantage that, regardless orientation within the measuring device, a transmitted light microscopy techniques can be used simultaneously with the mass and/or mechanical measurement of the biological system. However transmitted light microscopy techniques can still be used even if the cantilever and/or platform is not transparent by orienting the device such that light goes through the sample (for instance FIG. 4). Additional perspectives and optical information from the sample can be obtained by modifying the pathway of light with the help of mirrors as for instance mounting the cantilever on a side-view cantilever holder. In cases where cantilever and/or platform are not partially transparent and the orientation of the device does not allow light to go through the sample, optical information can be obtained by using fluorescence microscopy and/or reflective light microscopy techniques.

The cantilever and/or platform can be fully or partially coated with metallic layers, piezoresistive layers, piezo electric layers, etc. This has the advantage of improving the signal of reflected light microscopy techniques and/or improving the excitation and/or detection of the cantilever movement. Additionally, this has the advantage of applying to and/or reading electric signals from the sample. Electrical signals can be applied to and/or read from the sample as well by using micro-channeled cantilevers, such that mass and/or mechanical measurements together with electrical measurements of the biological sample can be obtain simultaneously.

In the measuring device, the cantilever can be immersed in a buffer solution. This allows detecting the total mass of a biological sample under physiological conditions. The cantilever can be fully or partially immersed in a buffer solution.

Advantageously, the cantilever can be surrounded by a diving bell (FIG. 2b). This has the advantage that the cantilever body can be partially kept out of the buffer solution, which can increase the quality factor of the cantilever and therefore the mass sensitivity.

The mass resolution of a cantilever mass measurement can be incremented by increasing the oscillation amplitude of the platform since the phase noise is then reduced. Thus, mass measurements are preferably performed by exciting a movement of the cantilever rather than using the cantilever movement due to the thermal noise.

The cantilever movement can be excited by using an intensity modulated light source, magnetically, electrically, thermally and/or mechanically induced. In particular the cantilever can be self-actuated for instance by containing piezoelectric elements and/or resistors that can be driven to induce a cantilever oscillation.

The cantilever can be a self-sensing cantilever for instance by integrating piezoresistors and/or piezoelectric elements to detect the cantilever deflection.

Advantageously the cantilever movement can be read out by an optical beam deflection scheme, a Doppler interferometer, etc.

A third inventive aspect of the invention relates to a method for determining mass and/or mechanical properties of a biological system with a microcantilever according to the invention and/or a measuring device according to the invention.

The method can also comprise exciting the microcantilever with one or more vibrational modes.

BRIEF DESCRIPTION OF THE DRAWINGS

The invention will be described in more detail herein after with reference to exemplary embodiments. In the drawings, FIG. 1 show a) and b) scanning electron microscopy (SEM) images showing perspective and side views of a position insensitive L-shaped microcantilever, c) schematic drawing of a L-shaped microcantilever and d) an optical microscopy top view of the L-shaped microcantilever and a cell attached to it.

DETAILED DESCRIPTION OF THE EMBODIMENTS

Figure 1:
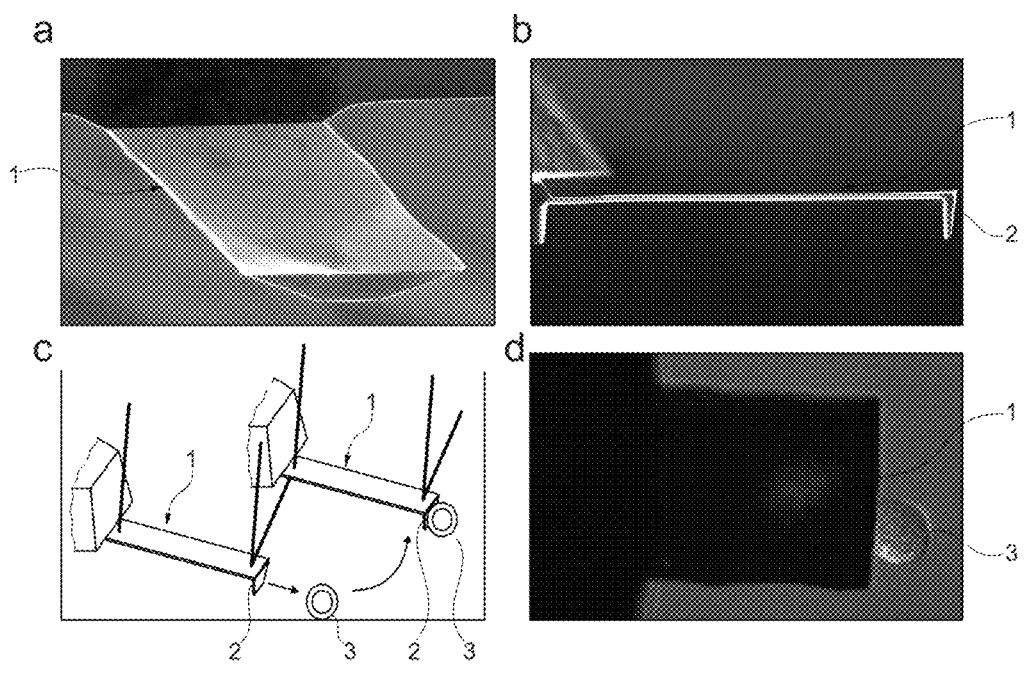

FIG. 1 shows a position insensitive L-shaped microcantilever 1 in various images FIGS. 1a, 1b and 1d, and a schematic drawing of the cantilever in FIG. 1c.

FIG. 1a shows a scanning electron microscopy (SEM) image of a perspective of a L-shaped microcantilever and FIG. 1b shows a side view of a L-shaped microcantilever, sculpted with a focused ion beam (FIB). FIG. 1d depicts an optical microscopy image showing the top view of the L-shaped cantilever of FIGS. 1a and 1b. In FIG. 1d a cell 3 attached to the cantilever 1.

In FIG. 1c a schematic picture of a cell 3 attached to a plate 2 of the L-shaped microcantilever 1 is shown. The cantilever 1 is moved laterally towards the cell 3 in order to attach the cell 3 to the functionalized plate 2. After this, the cantilever 1 is withdrawn from the surface of the Petri dish to measure the mass of the cell 3 over time.

FIG. 2a shows a cantilever 11 with a platform 12 attached at the free end of the cantilever 11, perpendicular to the cantilever beam 14. A cell 13 is attached to the platform 12. The platform 12 is linked to the of the cantilever 11. The whole platform 12 is moving essentially with the same oscillation amplitude as the cantilever 11. Therefore, the mass of the cell 13 attached on the platform 12 can be accurately determined.

The platform defines a T shaped cantilever in FIG. 2a, 2b. In FIGS. 2c-2f the platform 12 defines a L shaped cantilever. This means that the perpendicular platform can be attached at one side or at the middle to the cantilever beam.

In FIG. 2b cantilever of FIG. 2a is equipped with a diving bell 15. The cantilever 11 body can thus be partially kept out of a buffer solution, for example, which increases the quality factor of the cantilever 11 and therefore the mass sensitivity.

FIG. 2c shows a triangular cantilever 21 with a platform 22 at the free end of the cantilever 21 parallel to the cantilever beam 24. A cell 23 is attached to the platform 22.

FIG. 2d shows a cantilever where the platform 32 is in the plane of the cantilever beam 34 and connected to the beam via a small connector 35. A cell 33 is attached to the platform 32.

In FIG. 2e the platform 42 is attached with a distance to the free end of the cantilever 41, perpendicular to the cantilever beam 44. A cell 43 is attached to the platform 42.

FIG. 2f shows a cantilever 51 with a platform 52 attached with a distance to the free end of the cantilever 51, parallel to the cantilever beam 54 via a connector 56. A cell 53 is attached to the platform 52.

In FIGS. 2a-2f the cell 13, 23, 33, 43, 53 is prevented from migrating outside the platform by the edges of the respective platform 12, 22, 32, 42, 52. The platform 12, 22, 32, 42, 52 oscillates with a certain amplitude. The cell 13, 23, 33, 43, 53 attached to the platform 12, 22, 32, 42, 52 can freely move on the platform 12, 22, 32, 42, 52 while the mass sensitivity of the cantilever remains constant. The platform 12, 22, 32, 42, 52 is linked to a small portion of the cantilever. In addition physical or chemical modifications, like edges of the platform 12, 22, 32, 42, 52 or coatings can be used, so that the cell 13, 23, 33, 43, 53 is confined to stay within the platform 12, 22, 32, 42, 52, being very unlikely that a mammalian cells, for example, moves out from the platform 12, 22, 32, 42, 52.

FIG. 3a shows a three-dimensional picture of a cantilever, while FIGS. 3b to 3d show top views of different cantilever geometries.

The cantilever 61 in FIGS. 3a and 3b is divided in two pieces 64 and 62 by gap 65. The cell 63 kept in the piece 62 close to the front end of the cantilever 61.

FIG. 3c shows a cantilever 71 where the platform 72 is in the plane of the cantilever beam 74 and connected to the beam 74 via a small connector 75. Here the connector 75 is also in line to the cantilever beam 74. A cell 73 is attached to the platform 72.

FIG. 3d shows a triangular cantilever 81 with a platform 82 at the free end of the cantilever 81. A cell 83 is attached to the platform 82. Through the triangular shape with the two legs 84 and 85 a migration of the cell 83 along the cantilever beam is also hindered.

FIGS. 3a to 3d the cell 63, 73, 83 is prevented from migrating along the cantilever 61, 71, 81 by the gap 65, the connector 75 or the triangular shape with two legs 84, 85. The cantilever 61, 71, 81 oscillates with a certain amplitude. The cell 63, 73, 83 is attached to the piece 62, the platform 72, 82. The cell 63, 73, 83 stays within the piece 62 or the platform 72, 82 while the mass sensitivity of the cantilever remains largely constant. Physical or chemical modifications or coatings can be additionally used, to enhance the confinement of the cell 63, 73, 83 within the platform 72, 82 or piece 62.

Figure 4:
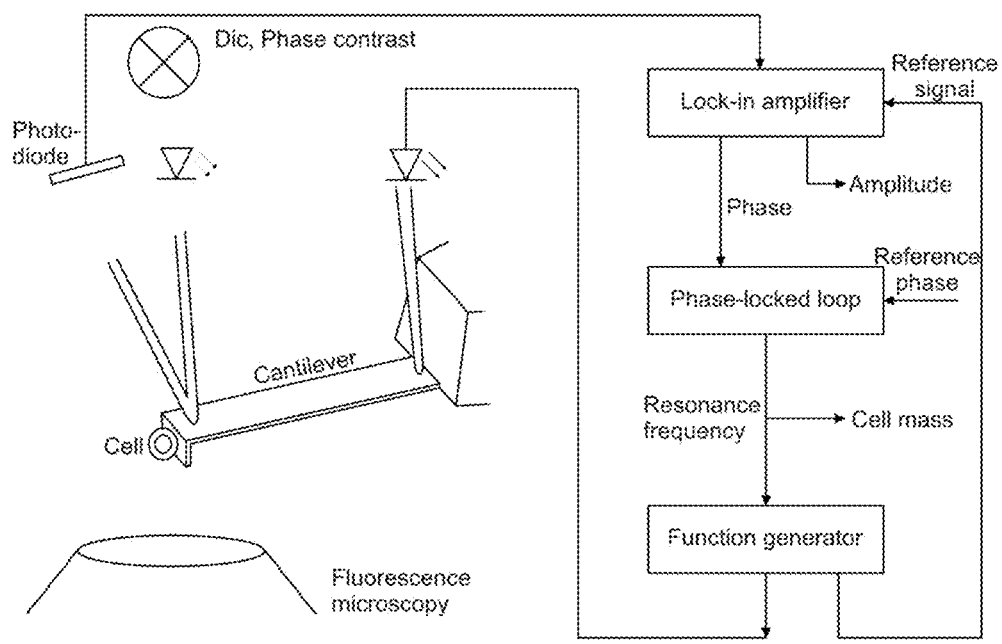
FIG. 4 shows a block diagram of the setup of the measuring device.

FIG. 4 shows a setup of a measuring device (or picobalance) as a block diagram. The intensity modulated blue laser excites an oscillatory movement of the microcantilever, which is detected by an infrared laser (red) reflected from the free cantilever end onto a four-quadrant photodiode. Also a near infrared laser can be used for excitation and a visible red laser. In fact different wavelengths can be used with different advantages and disadvantages as know to the person skilled in the art, as e.g. fluorescence may be limited in wavelength. To measure the amplitude and phase of the cantilever movement the signal from the photodiode is analyzed by a lock-in amplifier. For high time resolution measurements, a phase-locked loop instantaneously tracks the natural resonance frequency of the cantilever.

Figure 5:
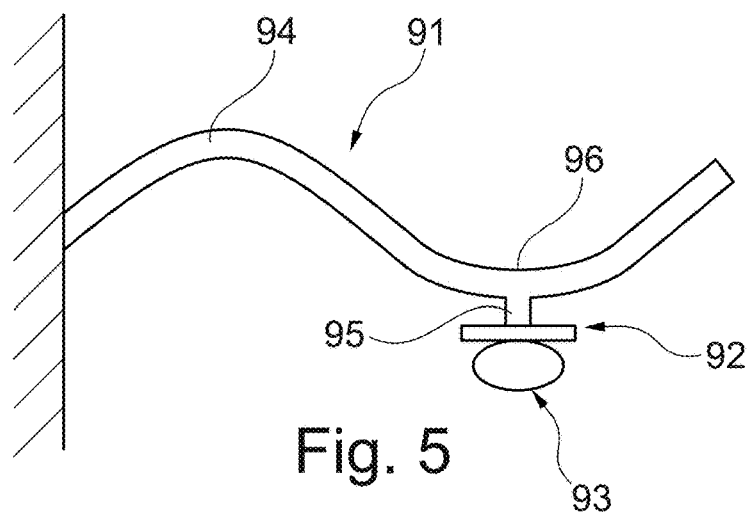
FIG. 5 shows a schematic drawing of a platform linked to a cantilever.

FIG. 5 shows a cantilever 91 where the platform 92 is parallel to the cantilever beam 94 at rest and connected to the beam 94 via a small connector 95. The platform 92 is attached with a distance to the free end of the cantilever 91, parallel to the cantilever beam 94. A cell 93 is attached to the platform 52.

For illustration purposes the cantilever beam 94 is shown oscillating at a higher flexural mode than the fundamental one. The antinode 96 of the cantilever beam 94 is shown in FIG. 5.

The platform 92 is linked to the antinode 96 of the cantilever beam 94. In other examples the platform 92 is linked near an antinode of the cantilever beam. Antinodes provide the highest oscillation amplitude for a certain eigenmode and therefore provide the highest mass sensitivity of the cantilever beam 94. The whole platform 92 moves with the amplitude of the antinode 96.

The number and location of antinodes 96 depends on the vibration eigenmode of the cantilever 91 and its geometry. The cantilever 91 can be oscillated with several eigenmodes simultaneously.

Figure 6:
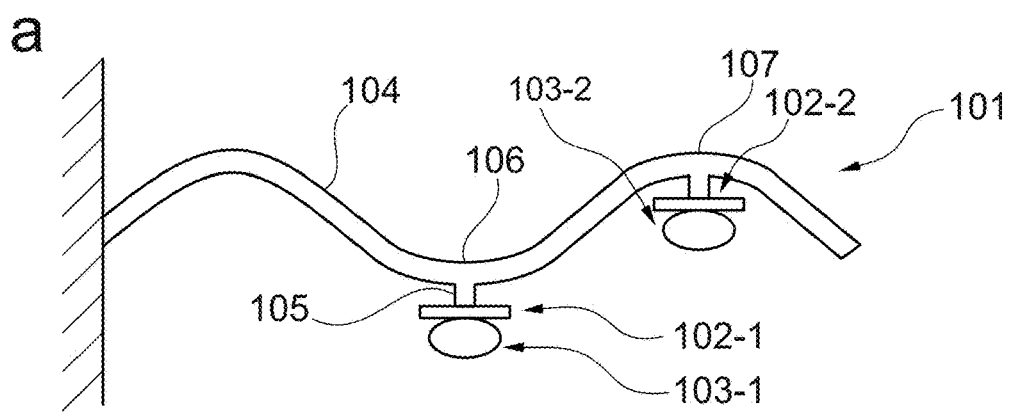
FIG. 6 shows a schematic drawings of two platforms linked to a cantilever.
Figure 6:
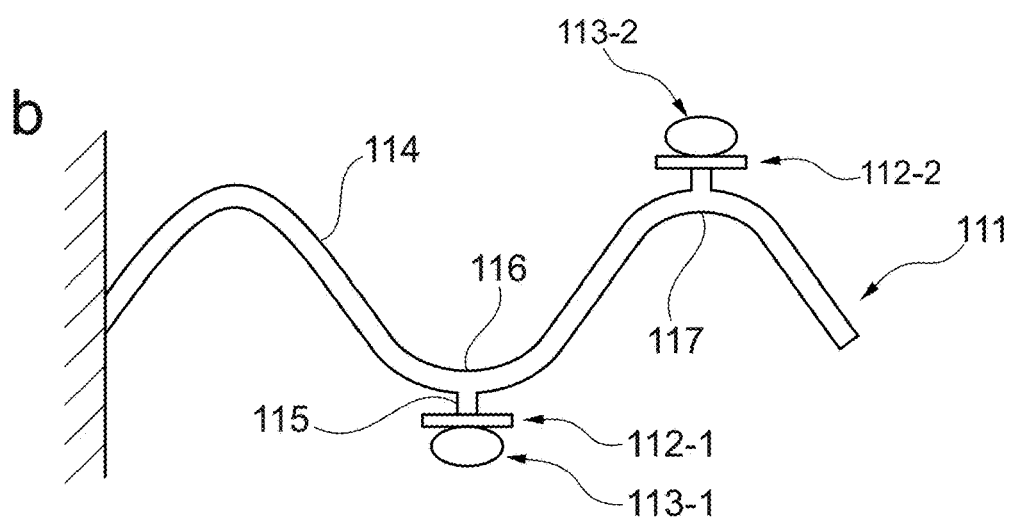

A cantilever can have more than one platform, as shown in FIGS. 6a and 6b.

FIG. 6a shows a cantilever 101 with two platforms 102-1, 102-2 and FIG. 6b also shows a cantilever 111 with two platforms 112-1, 112-2. In FIG. 6a each platform 102-1, 102-2 is linked to or near an antinode 106, 107. In FIG. 6b each platform 112-1, 112-2 is linked to or near an antinode 116, 117.

For illustration purposes the cantilever beam 104, 114 is shown oscillating at a higher eigenmode than the fundamental one. The antinodes 106, 107 of the cantilever beam 104 are shown in FIG. 6a. FIG. 6b shows the antinodes 116, 117 of the cantilever beam 114. FIGS. 6a and 6b show a cantilever oscillating at a certain eigenmode. However, oscillating at several eigenmodes simultaneously is possible, however it is not shown for simplicity.

Figure 2:
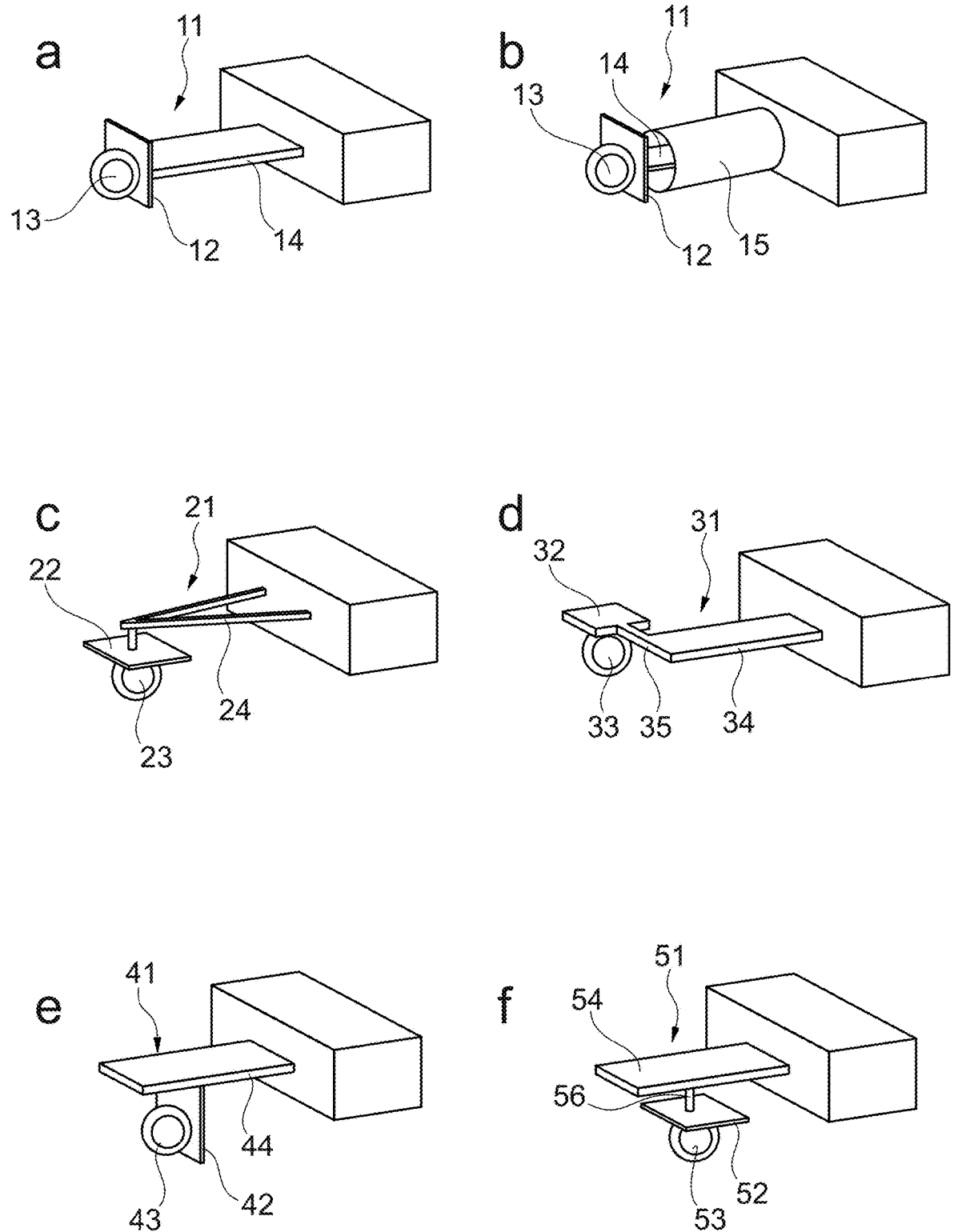
FIG. 2 shows schematic drawings of possible cantilever geometries using a platform as a barrier to cell migration.
Figure 3:
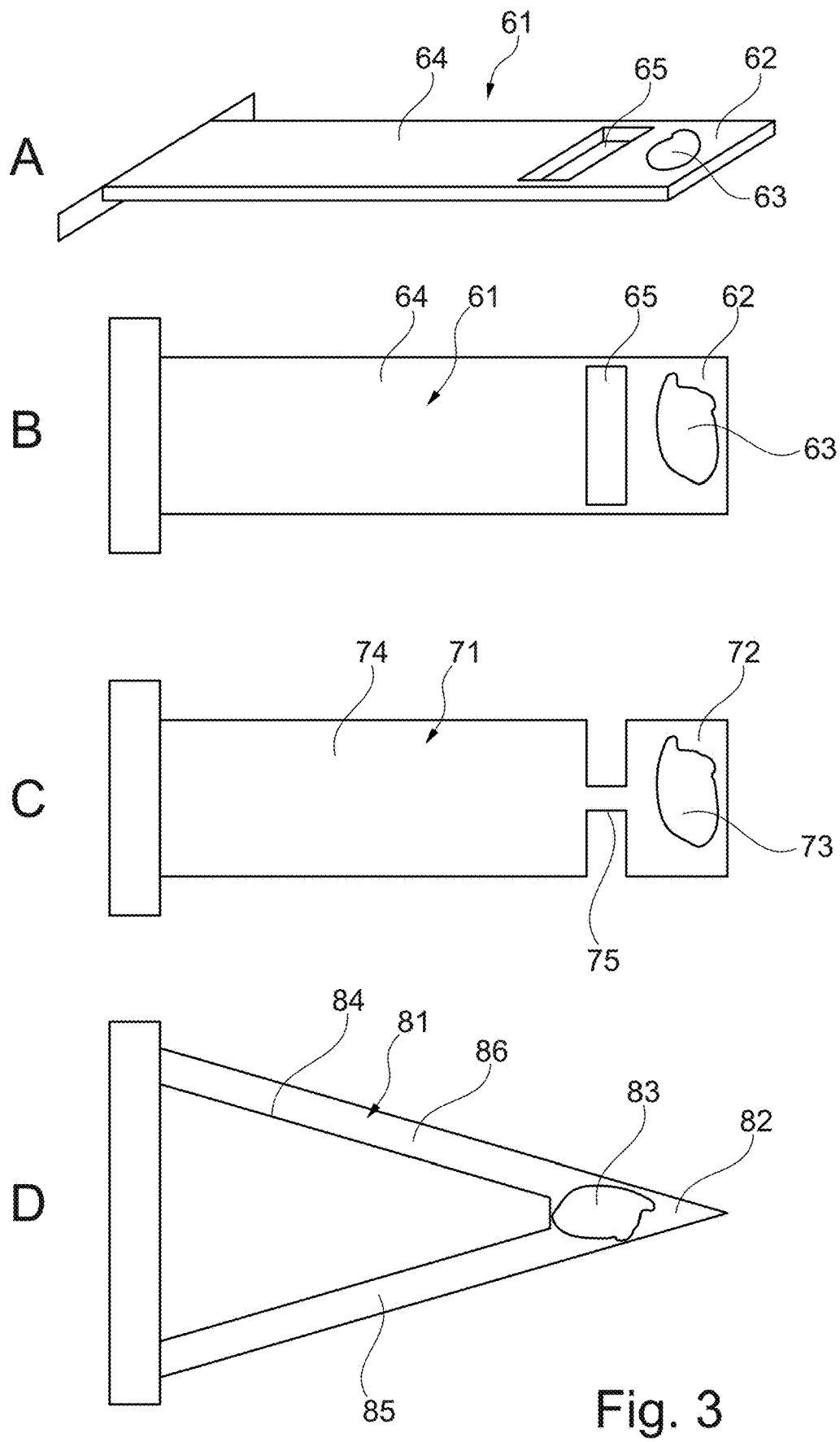
FIG. 3 shows a schematic drawings of possible cantilever geometries using a geometrical structure as a barrier to cell migration.

In the examples shown in FIG. 6a, 6b, the cantilever beam 104, 114 has one platform 102-1, 112-1 located at antinode 106, 116 and another platform 102-2, 112-2 located at antinode 107, 117 of the cantilever 101, 111. The platforms 102-1, 102-2 have the same orientation relative to the cantilever beam 104. Both are arranged at the same side of the cantilever beam 104. The platforms 112-1, 112-2 are arranged on different sides of the cantilever beam 114. Platforms 102-1, 102-2 of FIG. 6a and platforms 112-1, 112-2 of FIG. 6b are parallel to the cantilever beam 104 at rest (no oscillation), 114. In other examples the platforms may have any orientation relative to the cantilever, as shown in FIG. 2 or 3, for example.

It has to be noted that the described methods, apparatuses and systems can be used alone or as combination with the methods, apparatuses and systems described in this document. Furthermore, any of the aspects relating to the methods, apparatuses and systems described in this document can be combined. In addition to any combination of features belonging to one type of subject-matter also any combination between features relating to different subject matters is considered to be disclosed with this application. All features can be combined providing synergetic effects that are more than the simple summation of the features.

The invention has been described in detail in the drawings and foregoing description. However, the invention can be performed in many different embodiments and should not be limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The terminology used in the description and claims should not be construed as limiting the scope of the invention. Any reference signs in the claims should not be construed as limiting the scope. In the drawings same reference signs refer to same elements.

The invention claimed is:

1. Microcantilever in particular for a measuring device for determining mass and/or mechanical properties of a biological system,
   the cantilever has a barrier preventing migration of the biological system, characterized in that, the cantilever has a platform preventing migration of the biological system outside of the platform, where the platform is attached to a small portion of the cantilever.

2. Microcantilever according to claim 1,
   characterized in that, the barrier is a geometrical restriction on the cantilever.

3. Microcantilever in particular according to claim 1 or 2, characterized in that a part of the cantilever is functionalized to adhere and/or repel to a biological system.

4. Microcantilever according to claims 1 to 3,
   characterized in that, the platform is linked to the free end of the cantilever.

5. Microcantilever according to one of the claims 1 to 4,
   characterized in that, the platform is perpendicular to the cantilever beam.

6. Microcantilever according to one of the claims 1 to 5,
   characterized in that, the platform is parallel to the cantilever beam.

7. Microcantilever according to one of the claims 1 to 6,
   characterized in that, the platform is linked near or to an antinode of the cantilever.

8. Microcantilever according to one of the claims 1 to 7,
   characterized in that, the cantilever beam is provided with more than one platform.

9. Microcantilever according to one of the claims 1 to 7,
   characterized in that, it is compatible with state of the art optical microscopies.

10. Measuring device with a microcantilever according to one of the claims 1 to 9, characterized in that, it is a scanning probe microscope, atomic force microscope cytomass device, microfluidic system or a micro chamber.

11. Measuring device according to claim 10,
    characterized in that, the cantilever is immersed in a buffer solution.

12. Measuring device according to one of the claim 10 or 11,
    characterized in that, the cantilever is surrounded by a diving bell.

13. Measuring device according to one of the claims 10 to 12,
    characterized in that, the cantilever contains piezoelectric elements and/or resistors that can be driven to induce a cantilever oscillation.

14. Measuring device according to one of the claims 10 to 13,
    characterized in that, the cantilever movement can be excited by using an intensity modulated light source, magnetically, electrically, thermally and/or mechanically in use.

15. Measuring device according to one of the claims 10 to 14,
    characterized in that, the cantilever contains piezoresistors and/or piezoelectric elements capable for detecting cantilever deflection.

16. Measuring device according to one of the claims 10 to 15,
    characterized in that, the cantilever movement is read out by an optical beam deflection scheme or a Doppler interferometer.

17. Method for determining mass and/or mechanical properties of a biological system with a micro cantilever according to one of the claims 1 to 9 and/or a measuring device according to one of the claims 10 to 16.

18. Method according to claim 17,
    characterized in that, the cantilever is excited with one or more vibrational modes.

* * * * *